United States Patent [19]

Murase

[11] Patent Number: 5,379,446
[45] Date of Patent: Jan. 3, 1995

[54] CELLULAR RADIO WITH MICROCELLULAR/MACROCELLULAR HANDOFF

[75] Inventor: Atsushi Murase, Kanagawa, Japan

[73] Assignee: British Telecommunications public limited company, London, England

[21] Appl. No.: 969,277

[22] PCT Filed: May 24, 1991

[86] PCT No.: PCT/GB91/00823
§ 371 Date: Jan. 22, 1993
§ 102(e) Date: Jan. 22, 1993

[87] PCT Pub. No.: WO91/19403
PCT Pub. Date: Dec. 12, 1991

[30] Foreign Application Priority Data

May 30, 1990 [GB] United Kingdom ............... 9012044

[51] Int. Cl.$^6$ ............................................. H04Q 7/00
[52] U.S. Cl. ..................... 455/33.2; 455/56.1; 379/60
[58] Field of Search ............ 455/33.1, 33.2, 33.3, 455/33.4, 54.1, 54.2, 56.1, 226.3, 53.1, 67.1; 379/59, 60, 63

[56] References Cited

U.S. PATENT DOCUMENTS

| | | | |
|---|---|---|---|
| 4,556,760 | 12/1985 | Goldman | 179/2 |
| 4,718,081 | 1/1988 | Brenig | 379/60 |
| 5,203,010 | 4/1993 | Felix | 455/33.2 |
| 5,239,675 | 8/1993 | Dudczak | 455/33.2 |
| 5,276,906 | 1/1994 | Felix | 379/60 |

FOREIGN PATENT DOCUMENTS 2204215 11/1988 United Kingdom.

OTHER PUBLICATIONS

Kanai: "A Handoff Control Process for Microcellular Systems" pp. 170–175, 1988 IEEE for PCT/GB91/00823.

Primary Examiner—Curtis Kuntz
Assistant Examiner—Nguyen Vo
Attorney, Agent, or Firm—Nixon & Vanderhye

[57] ABSTRACT

A cellular radio system comprises a plurality of basic stations each having a radio transceiver serving a cell of the system. A mobile station of the invention has a radio transceiver for communicating with one or other of the base stations, as well as long term averaging units ($LTA_0$, $LTA_1$, $LTA_N$) for time averaging handover criterion (HOC) measurements over a first averaging period. The mobile station also includes a summer ($S_N$) for applying a first hysteresis margin to the time averaged HOC measurements to provide a first handover indicator. The mobile station also includes short term averaging units ($STA_0$, $STA_1$, $STA_N$) for time averaging HOC measurements over a second averaging period which is relatively short compared to the first averaging period, as well as a summer ($S_W$) for applying a second hysteresis margin, which is relatively large compared to the first hysteresis margin, to the time averaged HOC measurements to provide a second handover indicator. The mobile station further includes a gate ($OR_1$) for assessing handover requirements of the mobile station on the basis of the first and second handover indicators, whereby on the one hand relatively gradual variations in HOC can be assessed and on the other hand relatively sudden variations in HOC can also be assessed.

10 Claims, 5 Drawing Sheets

Fig. 7.

|  | CONVENTIONAL TECHNIQUE | THIS INVENTION |
|---|---|---|
| PARAMETERS (T=AVERAGING PERIOD H=HYSTERESIS MARGIN) | T = 10 SECONDS<br>H = 7 dB | $\{T_1 = 10$ SECONDS, $H_1 = 7$ dB$\}$<br>$\{T_2 = 480$ ms, $H_2 = 15$ dB$\}$<br>BOTH EFFECTIVE INDEPENDENTLY |
| DELAY IN TYPICAL PATHLOSS (CELLRADIUS 3km) | 700~800m | 700~800m |
| DELAY IN SUDDEN PATHLOSS | 7 SECONDS | UNDER 1 SECOND |

VEIHCULAR VELOCITY: 50 km/h

CELLULAR RADIO WITH MICROCELLULAR/MACROCELLULAR HANDOFF

BACKGROUND

I. Field of the Invention

The present invention relates to cellular radio, and in particular, although not exclusively, to a cellular radio system having overlapping macrocells and microcells.

II. Related Art and Other Considerations

A conventional cellular radio system has a number of radio base stations each serving a respective radio coverage area or cell, with which a mobile radio station can communicate over a radio link. As a mobile station moves from one cell to the next, the communication link is transferred from the present base station to the next base station using a procedure known as hand-over or hand-off. The need for hand-over is usually determined on the basis of one or more criteria. Commonly used criteria are:

1) received signal strength indication (RSSI) of the mobile at the base station, or base stations at a mobile station,
2) relative distance measurement of the mobile from the two closest base stations,
3) level of interference from the nearest base station operating on the same frequency, and
4) in digital systems, bit error rate (BER).

The cells of conventional cellular radio systems are relatively large, typically several kilometers across, and this allows time for data to be acquired for even a fast moving mobile station and a decision made on the basis of trends in that data. Recently there have been moves towards having cellular radio systems with relatively small cells of up to a few kilometers in diameter, and typically less than one kilometer in diameter, and these are often referred to as "microcells" while the relatively large, sometimes called wide area cells are often referred to as "macrocells". These terms do not indicate absolute size limitations but rather reflect the relative size of these two cell types. Microcellular radio systems should provide a better frequency re-use and hence greater user density. Proposals for microcellular systems suggest their application to road network, for example motorways where high speed mobile stations will pass through a microcell very quickly. This means that the time available for measurement of a handover criterion, e.g. RSSI, BER or interference level, for use in a hand-over decision is limited. Furthermore, the radio coverage of microcells is subject to large variations in signal strength over short distances relatively, for example in an urban environment.

Taking RSSI as an example of a possible handover criterion in the handover decision or cell reselection for an idle mobile, its use in conventional cellular radio systems is complicated by the variation of RSSI, caused by factors other than pathloss due to changing distance of the mobile from a base station. Considering a simplified situation, see inset sketch in FIG. 1, where a mobile station MS moves between two cells served respectively by base stations BS1 and BS2, the received signal strength of the two base stations at the mobile station varies not only with distance, i.e. diminishes due to path loss, but also varies with fast (Rayleigh) fading and shadowing, see graph in FIG. 1. In this simplified example the 'ideal' point for handover is half way between the base station where the RSSI for both base stations is the same—where their pathloss curves intersect. However the effects of fading and shadowing lead to uncertainty of the level of RSSI and to pathloss, hence render determination of the correct handover point more difficult. However by time-averaging the RSSIs the effect of fading and shadowing can to some extent be overcome. This time averaging does introduce a delay, referred to as the time averaging delay, into the handover/cell reselection process. The situation is further complicated, however, because if handover occurs where the averaged values for RSSI are the same there is a significant probability that variation in the momentary levels will be sufficient to trigger the system to make an unnecessary handover back to the original base station. To reduce the probability of such unnecessary handover occuring a hysterasis quantity is introduced which, in effect offsets the RSSI of the current base station relative to the RSSI of destination base station. A simplified example of this is shown in FIG. 2, in relation to the idealised situation of FIG. 1, in FIG. 2 the path loss curve for BS1 is shown offset by a hysteresis element H, with the result that the intersection (handover) point with the path loss curve (2) for BS2 is also offset, in positional terms towards BS2.

The two handover parameters, Averaging period (T) and Hysteris margin H, are related to the two handover qualities frequency of unnecessary handover, and handover delay D as shown in FIG. 3. The standard deviation ($S\sigma$) of RSSIs varies with the Averaging period T; the hysteresis margin H is a function of $S\sigma$, and frequency of probability of unnecessary handover Pu; and Handover delay D is the sum of the Averaging Delay and Hysteris delay. For macrocells of a few kilometers diameter where the Handover Delay in distance terms is of the order of several hundred meters e.g. 700–800 meters, the Averaging period T and Hysteris margin H could typically be T = 10 secs and H = 7 dB. Such criterion can provide satisfactory results in a macrocell environment, however if applied to a microcell context problems occur.

In a microcellular environment large variations of signal level, and hence RSSI of a base station at a mobile station, occur over relatively short distances, as shown by the example graph in FIG. 4. As indicated in the inset sketch in FIG. 4, microcells A+B overlap at a road junction, and generally provide coverage over only their respective road. When a mobile MS moves from the road served by base station A into the road served by base station B, as shown in the inset sketch in FIG. 4, the mobile MS experiences the variation in signal strength from the base stations of the graph in FIG. 4. The significant effect occurs as the mobile turns the corner, as indicated on the graph, where an almost step function pathloss effect occurs. The present invention is concerned with a cellular radio system which seeks to cope with such microcellular situations while still maintaining the quality of handover control in macrocellular situations.

SUMMARY

According to a first aspect the present invention provides a cellular radio system comprising: a plurality of base stations each having a radio transceiver serving a cell of the system; a mobile station having a radio transceiver for communicating with one or other of the base stations; and characterized by the system having on the one hand first means for time averaging handover criterion measurements over a first averaging period, means for applying a first hysteresis margin to the time averaged handover criterion measurements to provide a first handover indicator, and having on the other hand a second means for time averaging handover criterion measurements over a second averaging period which is relatively short compared to the first averaging period, and means for applying a second hysteresis margin, which is relatively large compared to the first hysteresis margin, to the time averaged handover criterion measurements to provide a second handover indicator, and means for assessing handover requirements of the mobile station on the basis of the first and second handover indicators; whereby on the one hand relatively gradual variations in handover criterion can be assessed and on the other hand relatively sudden variations in handover criterion can also be assessed.

Preferably the first averaging period is several times the second time averaging period, in particular of the order of 20 times. Preferably the first hysteresis margin is a significant fraction of the second hysteresis margin, in particular of the order of half.

A corresponding method is also provided

BRIEF DESCRIPTION OF THE DRAWINGS

A preferred embodiment of the invention will now be described by way of example and with reference to the accompanying drawings.

Figure 5:
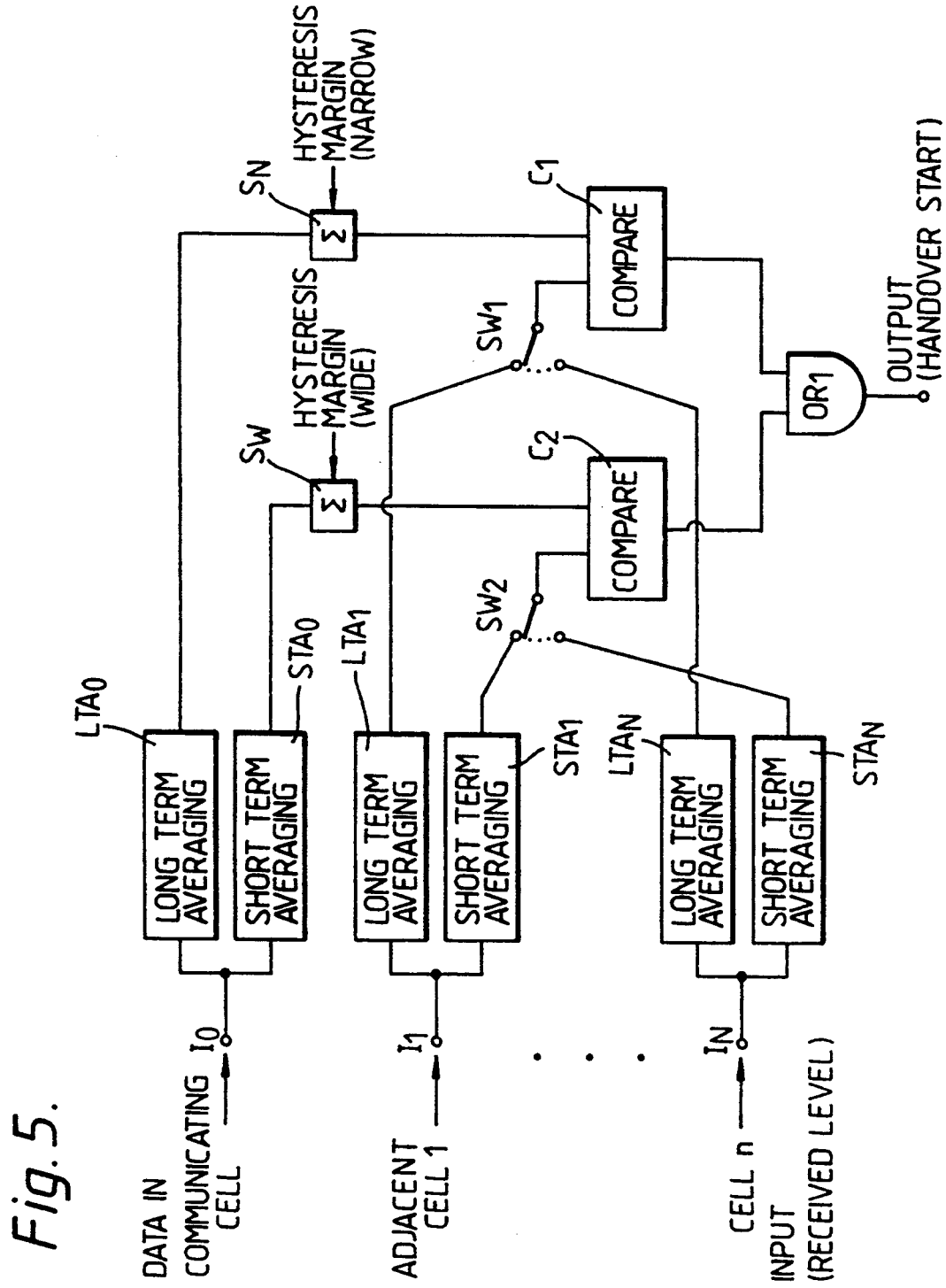
Figure 6:
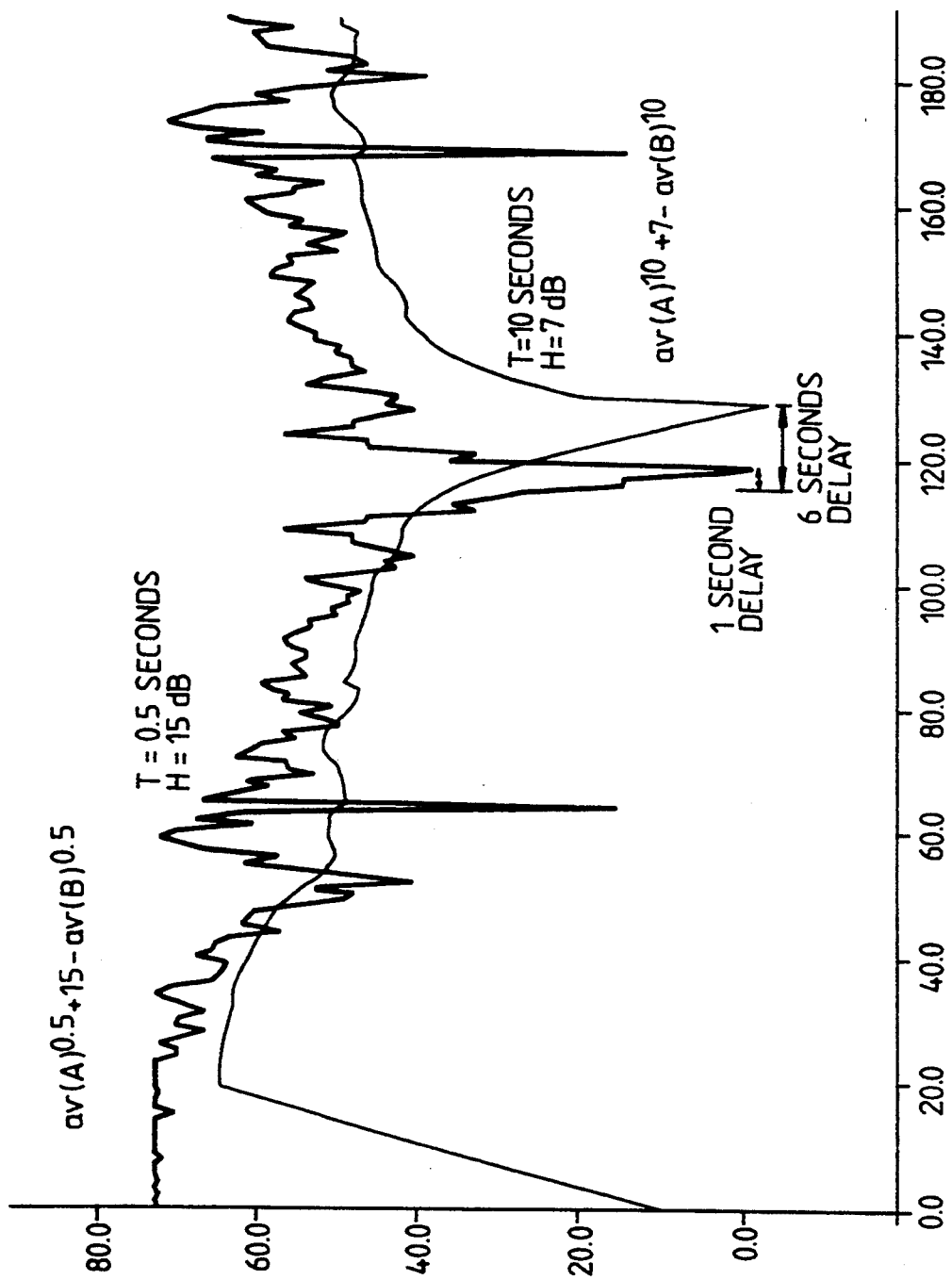

FIG . 4 shows a graph of received signal strength at a mobile station of two base stations (A, B) in a microcellular system, with inset a simplified plan of the two radio cells;

FIG. 5 is a schematic block diagram of apparatus forming part of the preferred embodiment;

FIG. 6 shows a graph illustrating the response of the apparatus in FIG. 5 in a microcellular environment; and FIG. 7 is a table comparing typically examples of averaging delays and hysteresis margins for conventional systems and that of the preferred embodiment.

DETAILED DESCRIPTION OF THE DRAWINGS

The base station and mobile station transceiver equipment for the cellular system are conventional and will not be described further. The mobile station has signal strength measuring equipment for measuring the received signal strength of base stations, which is likewise conventional and will not be described further. The apparatus of the preferred embodiment additional to these equipments is shown in FIG. 5 and may be either at mobile or base station.

The additional apparatus of the preferred embodiment has inputs ($I_0$ to $I_N$) for receiving received signal strength data for the current cell ($I_0$) and adjacent cells ($I_1$ to $I_N$) to which the mobile station obtaining the data may be handed over. Each input I is connected to a long term averaging unit ($LTA_0$–$LTA_N$) and a short term averaging unit ($STA_0$–$STA_N$). The long term averaging unit ($LTA_0$) provided with the data for the current communicating cell is connected to a first summer $S_N$ which is provided with a narrow hysteresis margin $HM_N$ while the short term averaging unit $STA_0$ which is also provided with the data for the current communicating cell is connected to a second summer $S_W$ provided with a wide Hysteris Margin $HM_W$. The first or long averaging period is several times the second or short averaging period. In a preferred embodiment, the first or long averaging period is between 10–100 times the second or short averaging period, and most preferably the first averaging period is substantially 20 times the second averaging period. The first hysteresis margin is a significant fraction of the second hysteresis margin. Preferably the first hysteresis margin is between 0.25 and 0.75 of the second hysteresis margin, and more preferably substantially 0.5 of the second hysteresis margin. The output of the first summer $S_N$ is connected to a first comparator $C_1$ and the output of the second summer $S_W$ is connected to a second comparator $C_2$. The outputs of the remaining long term averaging units ($LTA_1$–$LTA_N$) are selective connectable via a first switch $SW_1$ to the first comparator $C_1$, and the remaining short term averaging units ($STA_1$–$STA_N$) are similar connectable via a switch $SW_2$ to the second comparator $C_2$. The outputs of the comparators $C_1$, $C_2$ are connected as inputs to an OR gate OR1, the output of which forms a Handover signal.

Typical values for the LTA=T, and STA=$T_2$, and $HM_N=H_1$ and $HM_W=H_2$ ar shown in FIG. 7.

Figure 1:
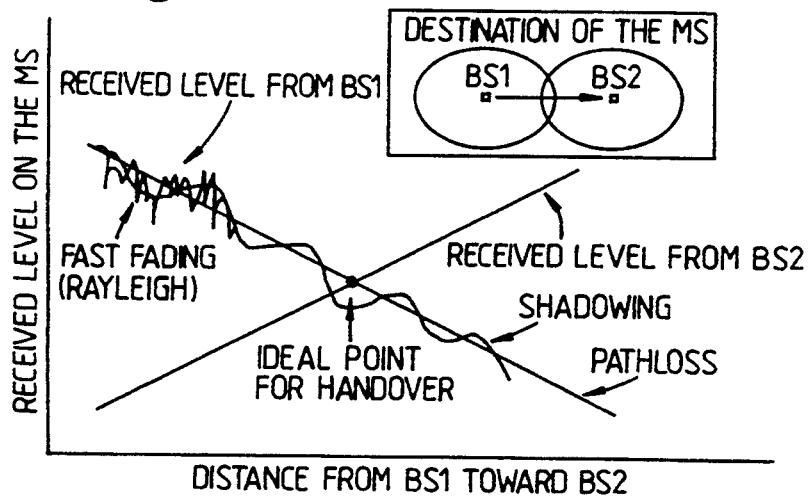
FIG. 1 shows a graph illustrating the variations of received signal strength at a mobile station (ms) of two base stations (BS1, BS2) at points between them, with inset a sketch illustrating the simplified arrangement of the radio cells of the two base stations.
Figure 2:
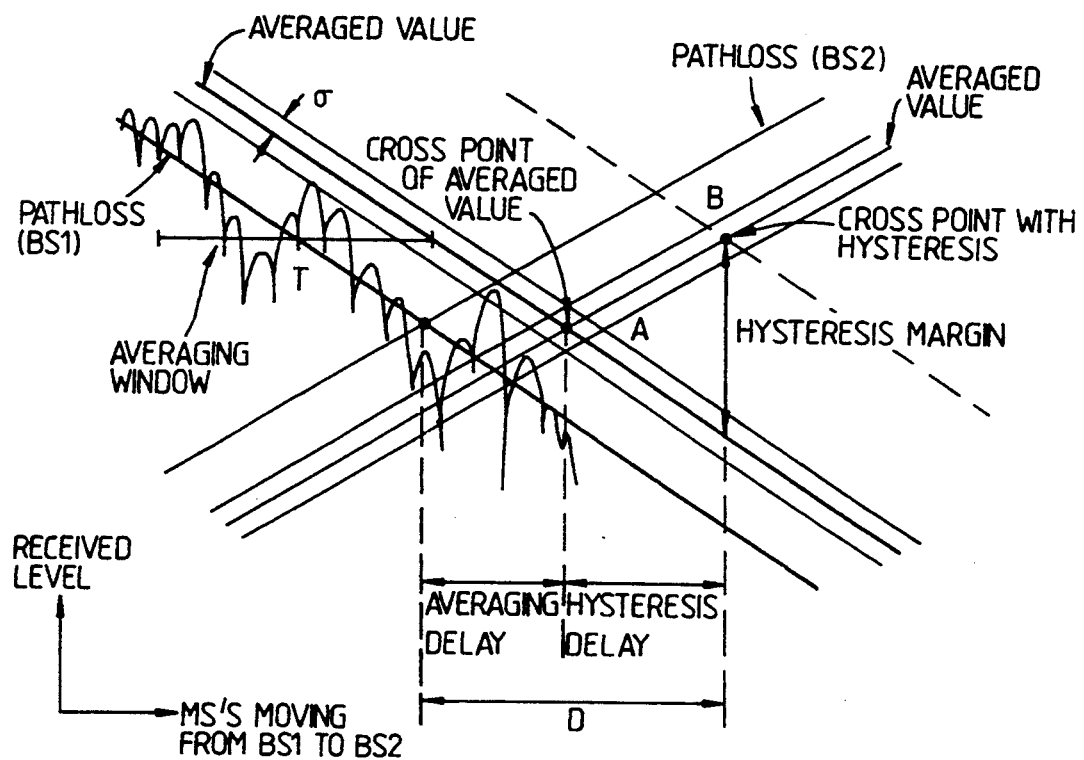
FIG. 2 shows a graph similar to that of FIG. 1 with factors of time averaging and hysteresis introduced.
Figure 3:
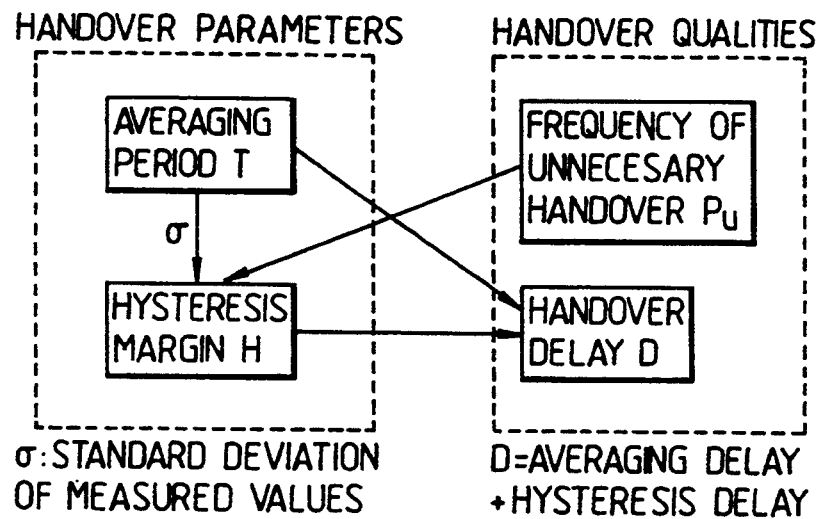
FIG. 3 is a diagram illustrating the inter-relationship of handover parameters and handover qualities.
Figure 4:
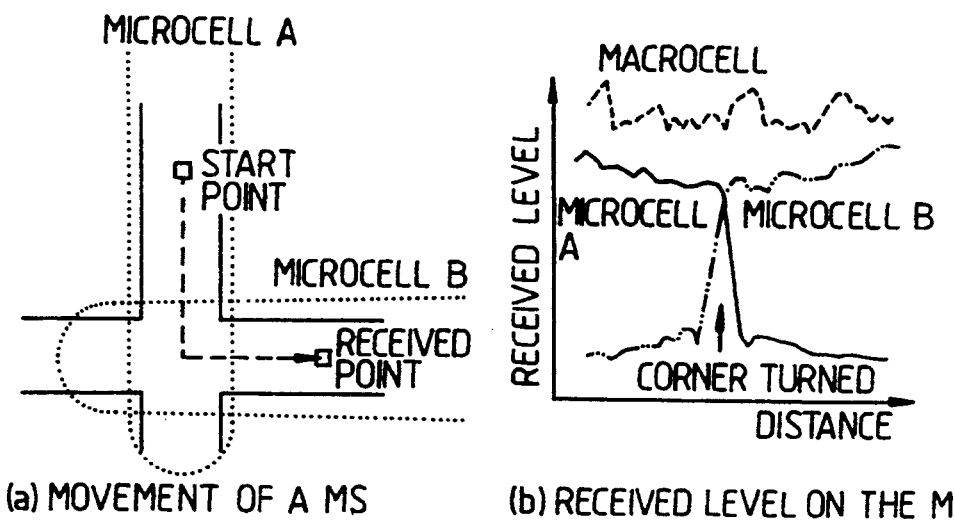

In a situation where pathloss varies gradually, e.g. a macrocell, the system operates generally as described above with $LTA/HM_N$ circuit providing for the current cell the significant comparison figure which is compared in the first comparator $C_1$ with similar data for adjacent cells. When conditions for handover occur the first comparator $C_1$ produces an out which via OR gate OR1, forms a Handover initiation signal. On the other hand in situation where pathloss is a sudden, step function e.g. the microcellular situation of FIG. 4 that $STA/HM_W$ circuits operate to provide the signals necessary to determine handover. An example response based on the signal patterns of 4 is shown in FIG. 6. Curve A shows the output of the second comparator $C_2$, while curve B shows the output of the first comparator $C_1$. The curve A produces, (e.g. FIG. 4) an output forming a handover request with a 1 second delay after the sudden step function in the RSSI of the base station A (FIG. 4), while the curve B, i.e. comparator $C_2$, also produces a response but some 6 seconds after the step function occurs. Thus in the, e.g. microcellular step function pathloss case the apparatus of the preferred embodiment provides the necessary handover on a time scale appropriate to the circumstances.

I claim:

1. A cellular radio system comprising a plurality of stations, the plurality of stations including:
   a plurality of base stations each having a radio transceiver serving a call of the system;
   a mobile station having a radio transceiver for communicating with at least one of the base stations;
   wherein at least one of the stations is a handover determination station which obtains handover criterion measurements with respect to at least two of the plurality of base stations for use in determining which of the at least two base stations is the base station with which the mobile station should communicate;
   wherein the handover determination station includes:

a first means for time averaging the handover criterion measurements over a first averaging period to obtain first time averaged handover criterion measurements, means for adding a first hysteresis margin to the first time averaged handover criterion measurements to provide a first handover indicator;

a second means for time averaging the handover criterion measurements over a second averaging period to obtain second time averaged handover criterion measurements, said second averaging period is relatively short compared to the first averaging period, means for adding a second hysteresis margin, which is relatively large compared to the first hysteresis margin, to the second time averaged handover criterion measurements to provide a second handover indicator; and means for assessing handover requirements of the mobile station on the basis of the first and second handover indicators;

wherein relatively gradual variations in the handover criterion measurements are assessed and relatively sudden variations in the handover criterion measurements are also assessed.

2. A cellular radio system as claimed in claim 1 wherein the handover criterion measurements are selected from at least one of the following:

1) signal strength of the base station at the mobile station;
2) signal strength of the mobile station at the base station,
3) bit error rate of the communication between the mobile station and the base station,
4) level of interference of two base stations operating at substantially the same frequency,
5) relative distance measurement of the mobile station from two closest of the plurality of base stations.

3. A cellular radio system as claimed in claim 1 wherein the first averaging period is several times the second averaging period.

4. A cellular-radio system as claimed in claim 1, wherein the first averaging period is between 10–100 times the second averaging period.

5. A cellular radio system as claimed in claim 1 wherein the first averaging period it substantially 20 times the second averaging period.

6. A cellular radio system as claimed in claim 1 where the first hysteresis margin is a significant fraction of the second hysteresis margin.

7. A cellular radio system as claimed in claim 1 where the first hysteresis margin is between 0.25 and 0.75 of the second hysteresis margin.

8. A cellular radio system as claimed in claim 1 wherein the first hysteresis margin is substantially 0.5 of the second hysteresis margin.

9. A method of assessing handover requirements of a mobile station in a cellular radio system comprising a plurality of stations including the mobile station and a plurality of base station, wherein each of the base stations has a radio transceiver serving a cell of the system and the mobile stations has a radio transceiver for communicating with one or other of the base stations, and wherein at least one of the stations obtains handover criterion measurements with respect to at least two of the plurality of base stations for use in determining which of the at least two base stations is the base station with which the mobile station should communicate; the method comprising the steps of:

time averaging handover criterion measurements over a first averaging period to obtain first time averaged handover criterion measurements, adding a first hysteresis margin to the first time averaged handover criterion measurements to provide a first handover indicator;

time averaging handover criterion measurements over a second averaging period which is relatively short compared to the first averaging period to obtain second time averaged handover criterion measurements, adding a second hysteresis margin, which is relatively large compared to the first hysteresis margin, to the second time averaged handover criterion measurements to provide a second handover indicator; and assessing handover requirements of the mobile station on the basis of the first and second handover indicators.

10. A method according to claim 9 which comprises the steps of:

averaging, over the first averaging period and over the second averaging period, signal strength measurements of at least some of the base stations taken at the mobile station, to provide a first averaged data over the longer averaging period and a second averaged data over the shorter averaging period;

summing with the first averaged data, for a first selected one of the plurality of base stations, the first hysteresis margin and summing with the second averaged data, for the first selected one of the base stations, the second hysteresis margin, to provide a first and a second signal strength indicator respectively;

comparing the first signal strength indicator with a signal strength measurement for at least a second selected one of the base stations averaged over the first averaging period;

comparing the second signal strength indicator with a signal strength measurement for at least the second selected one of the base stations averaged over the second averaging period, and determining on the basis of the comparisons the necessity for handover or cell re-selection for reregistration.

* * * * *